United States Patent
Kwak et al.

(10) Patent No.: US 9,401,500 B2
(45) Date of Patent: Jul. 26, 2016

(54) BATTERY PACKAGE FILLED WITH PHASE CHANGE MATERIAL AND BATTERY USING THE SAME

(75) Inventors: Jin Woo Kwak, Gyeonggi-do (KR); Kyong Hwa Song, Seoul (KR); Han Saem Lee, Gyeonggi-do (KR); Byung Sam Choi, Gyeonggi-do (KR); Chi Hoon Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1091 days.

(21) Appl. No.: 13/303,743

(22) Filed: Nov. 23, 2011

(65) Prior Publication Data

US 2013/0084487 A1    Apr. 4, 2013

(30) Foreign Application Priority Data

Sep. 29, 2011 (KR) .................. 10-2011-0099404

(51) Int. Cl.
  *H01M 2/00* (2006.01)
  *H01M 2/02* (2006.01)
  *H01M 10/6551* (2014.01)
  *H01M 10/613* (2014.01)

(52) U.S. Cl.
  CPC .......... *H01M 2/0245* (2013.01); *H01M 10/613* (2015.04); *H01M 10/6551* (2015.04)

(58) Field of Classification Search
  CPC .......... H01M 2/0245; H01M 10/5046; H01M 10/5004
  USPC ........................................ 429/163
  See application file for complete search history.

(56) References Cited

U.S. PATENT DOCUMENTS

| 6,059,016 A | * | 5/2000 | Rafalovich | ......... B60H 1/00492 |
|---|---|---|---|---|
| | | | | 165/10 |
| 2003/0031922 A1 | | 2/2003 | Maleki et al. | |
| 2005/0202310 A1 | * | 9/2005 | Yahnker et al. | ................. 429/62 |
| 2009/0169983 A1 | | 7/2009 | Kumar et al. | |
| 2010/0316821 A1 | * | 12/2010 | Chang et al. | ................. 428/35.8 |

FOREIGN PATENT DOCUMENTS

| JP | 2004259613 A | 9/2004 |
|---|---|---|
| JP | 2006-331927 A | 12/2006 |
| JP | 2008-159590 A | 7/2008 |
| JP | 2009266402 A | 11/2009 |
| KR | 10-2006-0048991 | 5/2006 |
| KR | 10-2007-0025418 | 3/2007 |
| KR | 10-2007-0099066 | 10/2007 |

* cited by examiner

*Primary Examiner* — Gary Harris
(74) *Attorney, Agent, or Firm* — Mintz Levin Cohn Ferris Glovsky and Popeo, P.C.; Peter F. Corless

(57) ABSTRACT

A battery and battery package is disclosed which improves a battery's heat dissipation capability by using an aluminum material and a phase change material capable of maintaining a suitable temperature through phase change according to a temperature in order to prevent a battery from being deteriorated in terms of performance. More specifically, battery package has a top case and a bottom case as a battery cell case for housing a battery cell. The top and bottom cases are adhered to each other, and either or both the top and bottom cases includes: a top sheet plate repeatedly undulated at predetermined intervals to form a plurality of unidirectionally extended convex parts to be filled with a phase change material; a bottom sheet plate formed in a flat shape and adhered to the top sheet plate; and a phase change material filled in between the convex parts and the bottom sheet plate.

19 Claims, 3 Drawing Sheets

BATTERY PACKAGE FILLED WITH PHASE CHANGE MATERIAL AND BATTERY USING THE SAME

CROSS-REFERENCE TO RELATED APPLICATION

This application claims under 35 U.S.C. §119(a) the benefit of Korean Patent Application No. 10-2011-0099404 filed on Sep. 29, 2011, the entire contents of which are incorporated herein by reference.

BACKGROUND (a) Technical Field

The present invention relates to a battery package filled with a phase change material and a battery using the same. More particularly, the present invention relates to a battery package and a battery using the same which, in combination, improve the system's heat dissipation capability by utilizing an aluminum material having a high thermal conductivity and a phase change material capable of maintaining a suitable temperature through phase change according to temperature in order to prevent the battery from having deteriorated performance.

(b) Background Art

In general, a pouch type secondary cell has one or more thin-film type cathodes and anodes, in which each pair of cathode and anode comes in close contact with each other with a separation film interposed between the cathode and anode. Multiple pairs of such cathodes and anodes may be alternately stacked to form a stacking-type internal structure. Alternatively, the cathodes and anodes may be wound so that the cathode and anode in each pair are in close contact with each other to form a winding-type internal structure.

An existing pouch type battery package has a structure in which aluminum packing foils and plastic layers are laminated with each other in order to improve its heat dissipation properties, to prevent the leakage of an internal electrolyte and to secure its electrical insulation properties. Since the pouch type battery package is formed to discharge heat accumulated within the battery to the outside, there is concern that there will be deterioration in performance of the entire battery in cold environments.

That is, batteries in electric vehicles suffer from local temperature differentiations and high heat which are caused by heat generated due to high speed charging, high-power and repeated charging. The temperature difference and high heat cause a thermal runaway phenomenon which deteriorates the efficiency and stability of the batteries. It is known that these problems are caused since the batteries lack a heat dissipation performance in comparison to heat produced within the batteries.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a battery package and a battery using the same which enables efficient heat dissipation and heat control by using a phase change material capable of absorbing heat when the temperature of the battery increases, and capable of discharging heat when the temperature of the battery decreases so that the internal temperature of the battery can be properly maintained, and by forming one or more filling spaces to be filled with the phase change material in a phase change material filling sheet so as to use the phase change material by filling the material in the filling spaces in liquid state at a temperature not lower than the melting point of the phase change material.

In one aspect, the present invention provides a battery package having a top case and a bottom case as a battery cell case for housing a battery cell, the top and bottom cases being adhered to each other, wherein at least one of the top and bottom cases includes: a top sheet plate repeatedly undulated at predetermined intervals to form a plurality of unidirectionally extended convex parts to be filled with a phase change material; a bottom sheet plate formed in a flat shape and adhered to the top sheet plate; and a phase change material to be filled in between the convex parts and the bottom sheet plate.

In an exemplary embodiment, the phase change material may be mixed with a filler material having a high thermal conductivity. Additionally, a top surface of the top sheet plate and a bottom surface of the bottom sheet plate may be coated with a thermoplastic resin and formed from an aluminum material.

Furthermore, the phase change material may be n-octadecane, and the filler material may be one selected from metal-based, carbon-based and ceramic-based materials and a combination thereof. The thermoplastic resin may be one selected from nylon, polyethylene and vinyl resins and a combination thereof.

In another aspect, the present invention provides a battery: including a battery cell; and a top case and a bottom case adhered to each other to house the battery cell, wherein the top case includes: a top sheet plate repeatedly undulated at predetermined intervals to form a plurality of unidirectionally extended convex parts to be filled with a phase change material; a bottom sheet plate formed in a flat shape and adhered to the top sheet plate; and a phase change material to be filled in between the convex parts and the bottom sheet plate.

In this exemplary embodiment, the bottom case may include: a top sheet plate repeatedly undulated at predetermined intervals to form a plurality of unidirectionally extended convex parts to be filled with a phase change material; a bottom sheet plate formed in a flat shape and adhered to the top sheet plate; and a phase change material to be filled in between the convex parts and the bottom sheet plate.

In addition, the phase change material may be mixed with a filler material having a high thermal conductivity, and a top surface of the top sheet plate and a bottom surface of the bottom sheet plate may be coated with a thermoplastic resin, and formed from an aluminum material.

Further, the phase change material may be n-octadecane, and the filler material may be one selected from metal-based, carbon-based and ceramic-based materials and a combination thereof, and the thermoplastic resin may be one selected from nylon, polyethylene and vinyl resins and a combination thereof.

Other aspects and exemplary embodiments of the invention are discussed below.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
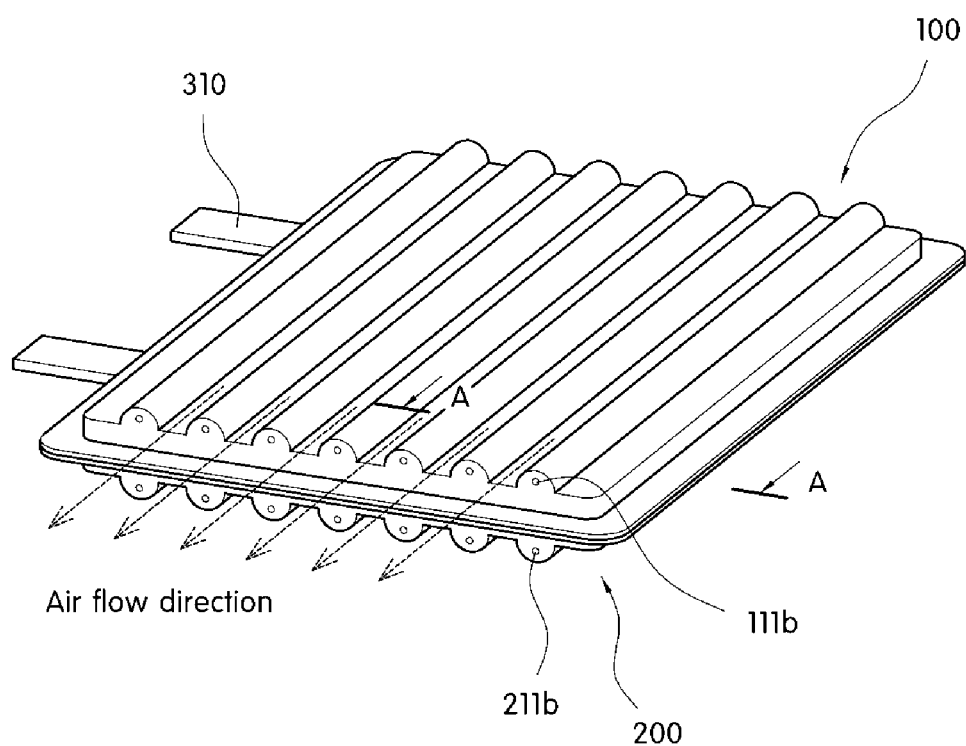
FIG. 1 is a perspective view showing an external appearance of a battery in accordance with an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As known in the art, it is necessary to maintain a battery at a temperature between 35 and 40° C., which is suitable for a battery system, to prevent performance deterioration of the battery in an environment with a low external temperature. However, there is a limit to maintaining the temperature of the battery within the suitable range by merely discharging heat accumulated within the battery to the outside.

Thus, the present invention employs, in a battery package, an aluminum material with a high thermal conductivity, and a phase change material capable of controlling temperature in order to allow a battery to exhibit excellent heat dissipation performance under ordinary climatic conditions, and to maintain the battery's temperature within a suitable range. Thus, the battery's performance can be maximized under various climatic environments.

For reference, the thermal conductivity (K) of the aluminum material is 230 W/mK. Specifically, the aluminum material employed in the present invention is used in a sheet type format, wherein the aluminum material is undulated in a regular pattern so as to improve the heat dissipation performance by air in battery cells. As a result, the surface area of the battery package is increased, and air flow passages are formed. In addition, the phase change material is introduced into filling spaces formed in the aluminum sheet to maintain the suitable temperature of the battery package.

Now, the present invention will be described with reference to the accompanying drawings.

Figure 2:
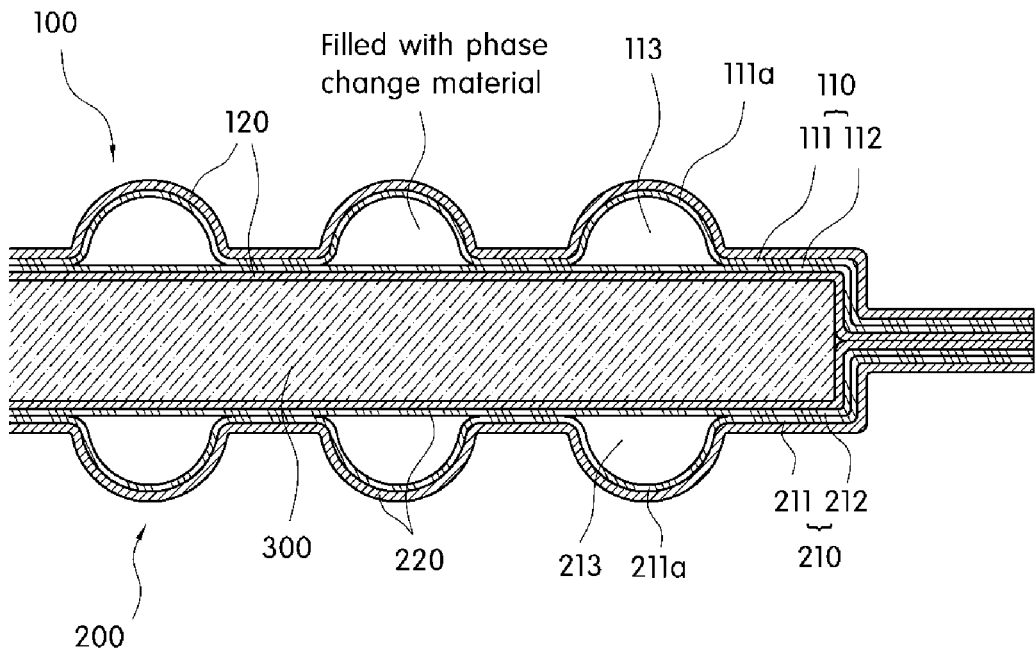
FIG. 2 is a cross-sectional view taken along A-A in FIG. 1.

Since the inventive battery package has flexible characteristics to be readily bendable, the inventive battery package may be implemented as an adhered assembly of a top case 100 and a bottom case 200, each of which is formed by at least one sheet filled with a phase change material, and which are adhered to each other along the marginal areas thereof to enclose a battery cell 300 as shown in FIGS. 1 and 2.

In order to use a phase change material capable of controlling temperature, the inventive battery package consists of a pair of phase change material filling sheets 110 and 210, each of which has filling spaces capable of being filled with the phase change material (i.e., phase change material filling parts to be described below).

Now, the battery package in accordance with an embodiment of the present invention will be described with reference to the top case 100 shown in FIG. 2.

Referring to FIGS. 1 and 2, the inventive battery package, which is a battery cell case for enclosing and housing a battery cell 300, includes a phase change material filling sheet 110 having phase change material filling parts 113 as filling spaces capable of being filled and filled with a phase change material, and a phase change material introduced into and filled in the phase change material filling parts. The top phase change material filling sheet 110 is made up of an aluminum material with a high thermal conductivity, and includes a top sheet plate 111 which is repeatedly undulated at predetermined intervals to form a plurality of elongated convex parts 111a to be filled with the phase change material, and a bottom sheet plate 112 adhered to the top sheet plate 111 through welding.

The top sheet plate 111 is undulated in a regular pattern so as to improve the heat dissipation performance of the battery cell 300 by air, thereby forming the elongated convex parts 111a (hereinafter, the parts may be referred to as convex parts) to be filled with the phase change material. As a result, the surface area of the top phase change material filling sheet 110 can be increased. Since the convex parts 111a extends unidirectionally only in the widthwise direction of the top sheet plate 111, air flow passages are formed between the convex parts 111a, so that cooling air can flow through the air flow passages. That is, since the spaces formed between the convex parts 111a serve as air flow passages, the heat dissipation performance can be enhanced.

In addition, since the bottom sheet plate 112, which is formed in a flat shape, is adhered to the top sheet plate 111 having the unidirectionally extending convex parts 111a, the phase change material filling parts 113 to be capable of being filled with the phase change material are formed at the areas of the convex parts 111a. Further, at least one end of each of the convex parts 111a is formed with a phase change material introduction needle aperture 111b for introducing the phase change material into the spaces formed between the convex parts 111a and the bottom sheet plate 112.

The phase change material is a material which can absorb heat when the temperature of the battery cell increases, and can discharge heat when the temperature decreases, so that the internal temperature of the battery cell can be suitably maintained, which enables efficient heat dissipation and thermal control. The heat accumulated internally when the temperature of the battery cell increases is discharged to the outside in accordance with temperature gradient through the phase change material or directly without passing through the phase change material. If the heat is discharged through the phase change material, the phase change will be caused in the phase change material, and the phase change material filled in the phase change material filling sheet will absorb heat in accordance with its heat capacity. Then, the heat absorbed to the phase change material is discharged when the external temperature decreases to maintain the suitable storage temperature of the battery cell, which can prevent the battery cell from having deteriorated performance.

Preferably, the phase change material filling sheet 110 is coated with a thermoplastic resin on its surfaces to secure an electrical insulating property. That is, the top surface of the top sheet plate 111 and the bottom surface of the bottom sheet plate 112 are coated with a thermoplastic resin insulation film 120. It is possible to use one selected from nylon, polyethylene resin and vinyl resins and a combination thereof as the thermoplastic resin.

In order to improve the phase change reactivity of the phase change material, i.e. in order to improve the heat transfer performance of the phase change material so that the phase change reaction of the phase change material from solid to phase and vice versa occurs smoothly, a filler material having a high thermal conductivity in a molten state may be mixed with the phase change material, whereby the temperature control capability can be efficiently exhibited.

It is possible to use n-octadecane as the phase change material, and to use one selected from metal-based, carbon-based and ceramic-based materials with a high thermal conductivity and a combination thereof as the filler material. Specifically, it is possible to use one selected from graphite, silicon carbide and boron nitride and a combination thereof as the filler material. For example, graphite, silicon carbide, and boron nitride may be mixed with the phase change material in the ratios of 5 to 10 wt %, 30 to 40 wt %, and 30 to 40 wt %, respectively.

As shown in FIGS. 1 and 2, the battery in accordance with the present embodiment includes a battery cell 300, a top case 100 and a bottom case 200, the top and bottom cases enclosing and housing the battery cell 100. The top case 100 and the bottom case 200 are adhered to each other to enclose the battery cell 300, thereby forming a battery cell case for housing the battery cell 300. The top and bottom cases 100 and 200 are thermally bonded to each other at the marginal areas thereof in a state in which the battery cell 300 is interposed therebetween, thereby forming the inventive battery package structure. That is, each of the top and bottom cases 100 and 200 has a phase change material filling sheet 110 or 210 having phase change material filling parts 113 or 213 capable of being filled with a phase change material and a phase change material introduced into and filled in the phase change material filling parts 113 or 213.

Each of the phase change material filling sheets 110 and 210 is made up of an aluminum material with a high thermal conductivity, and includes a top sheet plate 111 or 211 which is repeatedly undulated at predetermined intervals to form a plurality of elongated convex parts 111*a* or 211*a* to be filled with the phase change material, and a bottom sheet plate 112 or 212 adhered to the top sheet plate 111 or 211 through welding.

As can be seen from FIGS. 1 and 2, the bottom case 200 takes an inverted structure as compared to the structure of the top case 100. That is, as shown in the drawings, the sheet plate 212, which correspond to the top sheet plate 112 of the top case 100 in terms of function and shape, is positioned on the top of the sheet plate 211, which corresponds to the top sheet plate 111 of the top case 100 in terms of function and shape. However, for the convenience of description, the terms used for describing the elements of the top case 100 will be equally used for describing the elements of the bottom case 200 throughout the specification and claims regardless of the relative positions thereof.

The top sheet plate 111 or 211 is undulated in a regular pattern so as to improve the heat dissipation performance of the battery cell 300 by air flow, thereby forming, the elongated convex parts 111*a* or 211*a* (hereinafter, the parts may be referred to as "convex parts") to be filled with the phase change material). As a result, the surface area of the top and bottom cases 100 and 200 can be increased. Since the convex parts 111*a* or 211*a* extend unidirectionally only in the widthwise direction of the top sheet plate 111 or 211, air flow passages or channels are formed between the convex parts 111*a* or 211*a*, so that cooling air can flow through the air flow passages.

In addition, since the bottom sheet plate 112 or 212, which is formed in a flat shape, is adhered to the top sheet plate 111 or 211 with the unidirectionally extending convex parts 111*a* or 211*a*, the phase change material filling parts 113 or 213 capable of being filled with the phase change material are formed at the areas of the convex parts 111*a* or 211*a*.

Also, at least one end of each of the convex parts 111*a* is formed with a phase change material introduction needle aperture 111*b* or 211*b* for introducing the phase change material into the phase change material filling parts 113 or 213. Furthermore, the phase change material filling sheets 110 or 210 are coated with a thermoplastic resin on its surfaces to secure an electrical insulating property. That is, the top surface of the top sheet plates 111 or 211 and the bottom surface of the bottom sheet plates 112 or 212 are coated with a thermoplastic resin insulation film 120 or 220.

As the thermoplastic resin coated on the surfaces of the phase change material filling sheets 110 and 210, the top and bottom cases 100 and 200 are easily adhered to each other through thermal bonding. For example, reference numeral 310 indicates electrodes of the battery cell 300.

Figure 3:
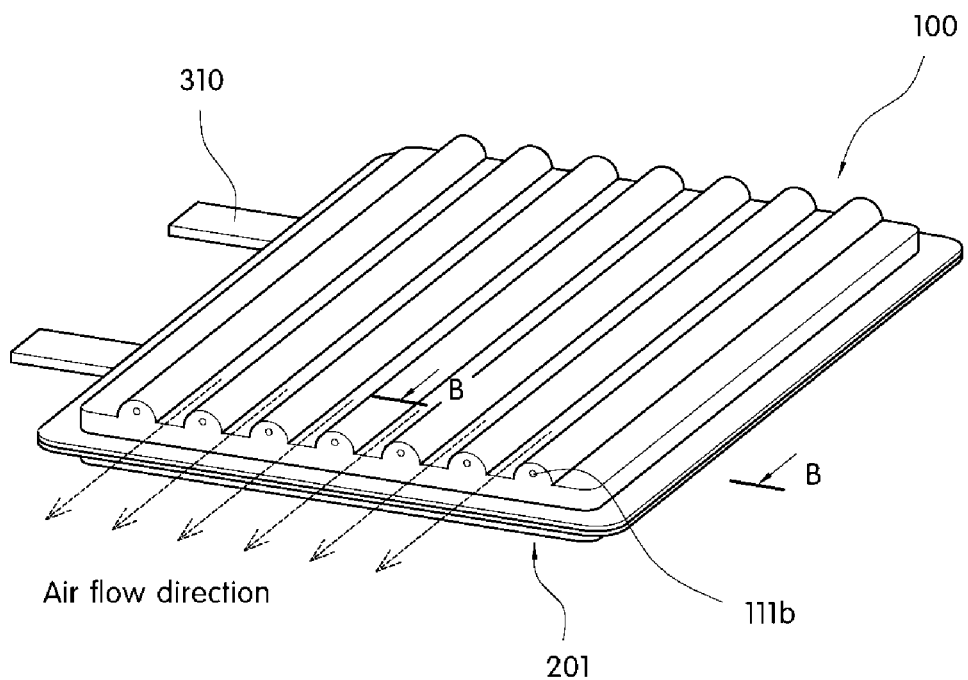
FIG. 3 is a perspective view showing an external appearance of a battery in accordance with another exemplary embodiment of the present invention.
Figure 4:
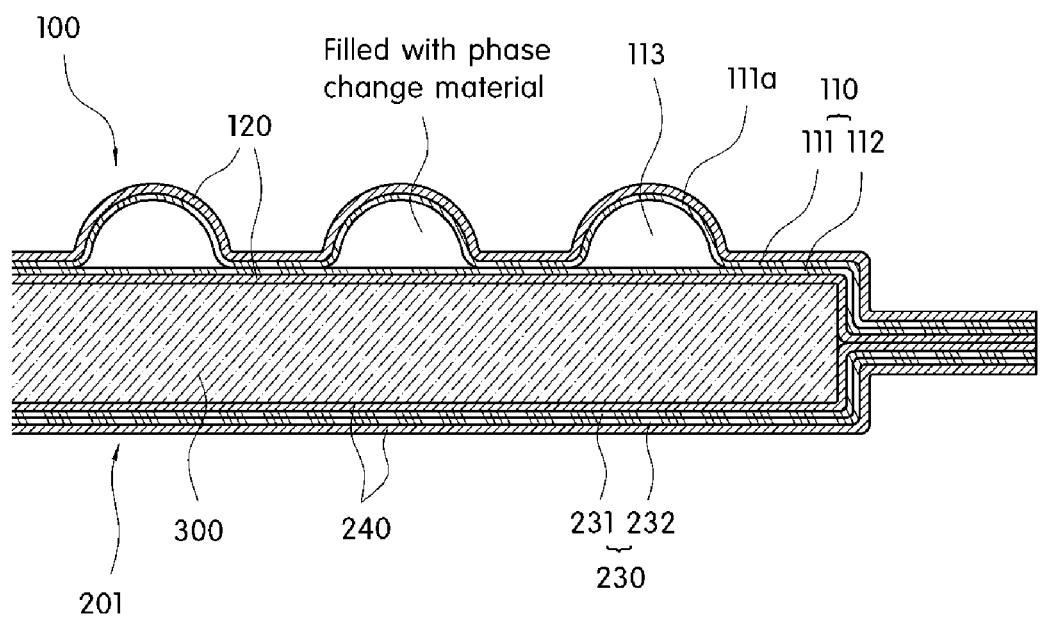
FIG. 4 is a cross-sectional view taken along B-B in FIG. 3.

In another embodiment of the present invention, the bottom case 201, which is adhered to the top case 100 to house the battery cell between the top and bottom cases 100 and 201, consists of a flat sheet plate 230 which is not filled with a phase change material, and a insulation layer 240 coated on a surface of the flat sheet plate 230, as shown in FIGS. 3 and 4. The bottom case 201, which serves as a case for enclosing and housing the battery cell together with the top case 100 like the bottom case 200 of FIGS. 1 and 2, is adhered to the top case 100 at the marginal areas thereof in a state in which the battery cell is interposed between the top and bottom cases 100 and 201, thereby housing the battery cell 300.

Although not shown in the drawings, in accordance with a still another embodiment of the present invention, the top and bottom cases may take an inverted arrangement as compared to those shown in FIG. 4, in such a manner that the top case may be formed in the same structure as that of the bottom case 201 of FIG. 4, and the bottom case is formed in the same structure as that of the top case 100 of FIG. 3.

As described above, in the inventive battery, one or both of the top and bottom cases make take a form of the inventive battery package structure. Here, the term, "battery," is used to cover various kinds of primary cells and secondary cells widely employed in electric products including electric vehicles.

Now, a process for fabricating the inventive battery package will be described. However, it shall be noted that the process is not provided to limit the present invention, but merely to help the understanding of the present invention.

An aluminum sheet plate of, e.g., 190 mm×280 mm×0.5 mm (W×L×H), is shaped to form a plurality of filling spaces capable of being filled with a phase change material through a stamping process, wherein each of the filling spaces has a semicircular cross-section with about a 10 mm diameter, the filling spaces being repeatedly formed with about an 8 mm interval, and a 9 mm marginal area is left at each of the opposite ends of the aluminum sheet plate.

Each of the phase change material filling spaces is formed with a phase change material introduction needle aperture with a diameter of not more than 1 mm at one or both ends thereof so that a phase change material can be introduced into the phase change material filling spaces using a needle.

Then a bottom sheet plate is prepared from an aluminum sheet to have the same size as the top sheet plate, and is adhered to the top sheet plate via a welding process. At this time, since there is no phase change material filling space in the adhered bottom sheet plate, wider marginal areas remain on the bottom sheet plate as compared to the top sheet plate. Therefore, the wider marginal areas may be adhered to the top sheet plate while wrapping the side areas of the battery cell, thereby enclosing the battery cell.

The outer surfaces of the phase change material filling sheet fabricated as described above are pre-heated to 200 to 300° C., then powder-coated for 4 to 6 seconds using a thermoplastic resin powder fluidized bed, and then post-baked to form a plastic insulation film of, e.g., about an 0.2 mm thickness. At this time, one selected from nylon 11, polyethylene and vinyl resin powders and a combination thereof may be used as the thermoplastic resin powder.

N-octadecane may be used as the phase change material, and a filler material with a high thermal conductivity may be introduced into the phase change material in a molten state at a temperature of about 30° C. or more. Meanwhile, a stirring process at 300 rpm or more is performed to uniformly disperse the filler material.

One selected from graphite, silicon carbide and boron nitride and a combination thereof may be used as the filler material. For example, when one filler material is introduced into the phase change material, a composition consisting of the phase change material of about 90 to 95 wt % and graphite of about 5 to 10 wt %, a composition consisting of the phase change material of about 60 to 70 wt % and silicon carbide of about 30 to 40 wt %, or a composition consisting of the phase change material of about 60 to 70 wt % and boron nitride of about 30 to 40 wt % may be introduced into the filling spaces.

A liquid state phase change material containing a filler material is introduced into and filled into the filling spaces through the phase change material introducing needle aperture using, e.g., a syringe needle, and then the needle apertures are blocked up using a small amount of the same thermoplastic resin in a molten state.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A battery package having a top case and a bottom case as a battery cell case for housing a battery cell, the top and bottom cases being adhered to each other, wherein at least one of the top and bottom cases comprises:
    a top sheet plate repeatedly undulated at predetermined intervals to form a plurality of unidirectionally extended convex parts;
    a bottom sheet plate formed in a flat shape and adhered to the top sheet plate;
    enclosed phase change material filling parts disposed in a gap between convex parts and the bottom sheet plate; and
    a phase change material filled in the phase change material filling parts,
    wherein at least one end of each of the convex parts is formed with a phase change material introduction needle aperture for introducing the phase change material into the enclosed phase change material filling parts,
    wherein the bottom sheet plate has a same size as the top sheet plate, and
    wherein a wider marginal area which remains on the bottom sheet plate is adhered to the top sheet plate while wrapping the side areas of the battery cell, to enclose the battery cell.

2. The battery package of claim 1, wherein the phase change material is mixed with a filler material having a high thermal conductivity.

3. The battery package of claim 1, wherein a top surface of the top sheet plate and a bottom surface of the bottom sheet plate is coated with a thermoplastic resin.

4. The battery package of claim 1, wherein each of the top and bottom sheets is made of an aluminum material.

5. The battery package of claim 1, wherein the phase change material is n-octadecane.

6. The battery package of claim 2, wherein the filler material is one selected from a group consisting of a metal-based material, a carbon-based material and ceramic-based material and a combination thereof.

7. The battery package of claim 3, wherein the thermoplastic resin is one selected from a group consisting of nylon, polyethylene and vinyl resins and a combination thereof.

8. A battery having a battery cell, and a top case and a bottom case adhered to each other to house the battery cell, wherein the top case comprises:
    a top sheet plate repeatedly undulated at predetermined intervals to form a plurality of unidirectionally extended convex parts;
    a bottom sheet plate formed in a flat shape and adhered to the top sheet plate;
    enclosed phase change material filling parts disposed in a gap between the convex parts and the bottom sheet plate; and
    a phase change material filled in the phase change material filling part,
    wherein at least one end of each of the convex parts is formed with a phase change material introduction needle aperture for introducing the phase change material into the enclosed phase change material filling parts,
    wherein the bottom sheet plate has a same size as the top sheet plate, and
    wherein a wider marginal area which remains on the bottom sheet plate is adhered to the top sheet plate while wrapping the side areas of the battery cell, to enclose the battery cell.

9. The battery of claim 8, wherein the bottom case comprises:
    a top sheet plate repeatedly undulated at predetermined intervals to form a plurality of unidirectionally extended convex parts to be filled with a phase change material;
    a bottom sheet plate formed in a flat shape and adhered to the top sheet plate; and
    a phase change material filled in between the convex parts and the bottom sheet plate.

10. The battery of claim 8, wherein the phase change material is mixed with a filler material having a high thermal conductivity.

11. The battery of claim 8, wherein a top surface of the top sheet plate and a bottom surface of the bottom sheet plate is coated with a thermoplastic resin.

12. The battery of claim 8, wherein each of the top and bottom sheets is made up of an aluminum material.

13. The battery of claim 8, wherein the phase change material is n-octadecane.

14. The battery of claim 10, wherein the filler material is one selected from metal-based, carbon-based and ceramic-based materials and a combination thereof.

15. The battery of claim 11, wherein the thermoplastic resin is one selected from a group consisting of nylon, polyethylene and vinyl resins and a combination thereof.

16. The battery of claim 9, wherein the phase change material is mixed with a filler material having a high thermal conductivity.

17. The battery of claim 9, wherein a top surface of the top sheet plate and a bottom surface of the bottom sheet plate is coated with a thermoplastic resin.

18. The battery of claim 9, wherein each of the top and bottom sheets is made up of an aluminum material.

19. A battery package comprising:
a top case and a bottom case as a battery cell case for housing a battery cell, the top and bottom cases being adhered to each other, wherein at least one of the top and bottom cases include:
a top sheet plate repeatedly undulated at predetermined intervals to form a plurality of unidirectionally extended convex parts to be filled with a phase change material;
a bottom sheet plate formed in a flat shape and adhered to the top sheet plate;
enclosed phase change material filling parts disposed in a gap between the convex parts and the bottom sheet plate; and
a phase change material filled in the phase change material filling parts,
wherein at least one end of each of the convex parts is formed with a phase change material introduction needle aperture for introducing the phase change material into the enclosed phase change material filling parts,
wherein the bottom sheet plate has a same size as the top sheet plate, and
wherein a wider marginal area which remains on the bottom sheet plate is adhered to the top sheet plate while wrapping the side areas of the battery cell, to enclose the battery cell.

* * * * *